United States Patent Office 3,803,264
Patented Apr. 9, 1974

3,803,264
MANUFACTURE OF IMPACT-RESISTANT
OLEFINIC-NITRILE COPOLYMERS
Russell K. Griffith, Chagrin Falls, and John F. Jones,
Cuyahoga Falls, Ohio, assignors to The Standard Oil
Company, Cleveland, Ohio
No Drawing. Filed Feb. 25, 1972, Ser. No. 229,483
Int. Cl. C08f 15/22, 15/10, 15/40
U.S. Cl. 260—879                                    8 Claims

ABSTRACT OF THE DISCLOSURE

Impact-resistant polymers which have low permeability to gases and vapors are prepared by polymerizing an olefinic nitrile, such as acrylonitrile, with a vinyl ether, such as butyl vinyl ether, to at least about 50% conversion, and then introducing into the polymerization reaction medium a conjugated diene monomer, such as butadiene-1,3, and completing the polymerization reaction in the presence of said diene monomer.

---

The present invention relates to the manufacture of polymeric resins which have low permeability to gases, and more particularly pertains to impact-resistant, thermoplastic polymeric resins which function as gas and vapor barrier materials and which are composed of a conjugated diene monomer, an olefinically unsaturated nitrile, and a vinyl ether, and particularly pertains to a novel process for preparing these polymeric materials.

The prior art processes for manufacture of impact-resistant, rubber-modified resins usually require at least two steps, i.e., rubber preparation and graft polymerization of the resin monomers in the presence of the rubber.

The products of the novel process of the present invention, which appear to have all of the desired properties usually found in rubber-modified resins such as impact resistance, clarity, and processability, can be prepared in a single reactor from simple monomeric materials and do not require the inclusion of a preformed rubber of any type. The products of the present invention are prepared by polymerizing a major portion of an olefinically unsaturated nitrile, such as acrylonitrile, and a minor portion of a vinyl ether, such as butyl vinyl ether, to a conversion of at least about 50% by weight of monomers to polymer and then the polymerization is continued in the presence of a conjugated diene monomer, such as butadiene-1,3.

The conjugated diene monomers useful in the present invention include butadiene-1,3, isoprene, chloroprene, bromoprene, cyanoprene, 2,3-dimethylbutadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

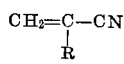

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The vinyl ethers useful in the present invention are those which have the formula

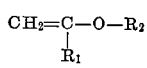

wherein $R_1$ is a lower alkyl group or preferably hydrogen, and $R_2$ is an alkyl group having from 1 to 12 carbon atoms or an aromatic group having from 6 to 12 carbon atoms. Vinyl ethers of this type include methyl vinyl ether, ethyl vinyl ether, the propyl vinyl ethers, the butyl vinyl ethers, the amyl vinyl ethers, the hexyl vinyl ethers, cyclohexyl vinyl ether, phenyl vinyl ether, the heptyl vinyl ethers, the octyl vinyl ethers, the nonyl vinyl ethers, the decyl vinyl ethers, methyl isopropenyl ether, and the like. Most preferred are the lower alkyl vinyl ethers including methyl vinyl ether, ethyl vinyl ether, the propyl vinyl ethers, and the butyl vinyl ethers.

The polymeric compositions of the present invention can be prepared by any of the known general techniques of emulsion or suspension polymerization by batch, continuous or intermittent addition of the monomers and other components so long as the conjugated diene monomer component is not included in the polymerization reaction until at least about 50% by weight of the other monomer components are converted to polymer. The preferred method is aqueous emulsion or suspension polymerization. The polymerization is preferably carried out in an aqueous medium in the presence of an emulsifying agent and a free-radical generating polymerization initiator at a temperature of from about 0° C. to 100° C. in the substantial absence of molecular oxygen. The simultaneous interpolymerization of a mixture of the conjugated diene monomer, the olefinically unsaturated nitrile, and the vinyl ether does not produce polymeric products which resemble the polymeric products resulting from the instant process.

The preferred polymeric compositions embodied herein are those resulting from the polymerization to at least 50% by weight conversion of 100 parts by weight of (A) from about 70 to 98% by weight of at least one nitrile having the structure

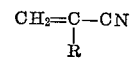

wherein R has the foregoing designation and (B) from about 2 to 30% by weight based on the combined weights of (A) and (B) of at least one compound having the structure

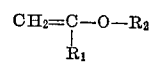

wherein $R_1$ and $R_2$ have the foregoing designations and then including in the polymerization medium from 1 to 40 parts by weight per 100 parts by weight of (A) plus (B) of (C) a monomer component having at least one conjugated diene monomer selected from the group consisting of butadiene and isoprene, and continuing the polymerization to a final conversion of from about 70 to 100% and preferably 80 to 100% by weight of monomers to polymer.

More specifically, the present invention can be illustrated in the polymerization of a mixture of acrylonitrile and vinyl butyl ether to a conversion of at least 50% by weight of monomers to polymer and then adding butadiene-1,3 and completing the polymerization reaction to produce a polymer having excellent impact strength and exceptionally good impermeability to gases and vapors when exposed to said gases or vapors in the form of a film or thin sheet. Preferably, the acrylonitrile vinyl butyl ether monomer feed should contain at least 70% by weight of acrylonitrile based on the combined weights of acrylonitrile and vinyl butyl ether, and more preferably the acrylonitrile fed to the polymerization reaction should be on the order of from 70 to 98% by weight based on the combined weights of all the acrylonitrile and butyl vinyl ether used in the polymerization.

In the foregoing polymerization it is preferred that from about 1 to 40, and preferably 1 to 20, parts of the conjugated diene monomer component be employed in the polymerization according to the process of this invention for each 100 parts of combined acrylonitrile and butyl vinyl ether monomer component. It has been found that as the relative amount of the diene monomer component is increased in the final polymeric product, the impact strength increases and the gas and vapor barrier properties decrease somewhat. It is generally preferred to use just enough of the conjugated diene monomer component to impart the desired impact strength to the polymeric product and at the same time to retain the optimum gas and vapor barrier properties of the polymeric product.

The polymeric products of the process of the present invention are readily processable, impact-resistant (i.e., having notched Izod impact strengths of at least 0.5 foot pounds per inch of notch) thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and their impact strength and low permeability to gases and vapors make them very useful in the packaging industry and make them very useful materials from which to manufacture bottles, film, and other types of containers for liquids and solvents. The low permeability of the novel resins produced by the process of this invention to gases such as oxygen and carbon dioxide make them particularly useful materials for the fabrication of bottles for carbonated beverages and vegetable oils.

In the following illustrative examples, the amounts of ingredients are expressed in parts by weight unless otherwise specified.

EXAMPLE 1

(A) A resin which is outside the scope of this invention was prepared by the polymerization of a mixture of the following ingredients:

| Ingredient: | Parts |
|---|---|
| Water | 250 |
| Emulsifier (Alipal CO 436)* | 1.5 |
| Acrylonitrile | 70 |
| Vinyl n-butyl ether | 30 |
| Limonene dimercaptan | 0.3 |
| $(NH_4)_2S_2O_8$ | 0.05 |

*Ammonium salt of sulfated ionylphenoxypoly(ethyleneoxy) ethanol.

The polymerization was carried out with stirring at 60° C. in the substantial absence of oxygen for about 20 hours to 89% conversion of monomers to polymer. Part of the resin was isolated by coagulation, washed and dried, and it was found to have a Brabender plasticorder torque of 2040 meter grams (230° C. and 35 r.p.m. to constant torque) and a notched Izod impact strength of 0.21 foot pounds per inch of notch.

(B) A resin which is within the scope of this invention was prepared by polymerizing a mixture of 250 parts of the latex from (A) above, 11.5 parts of butadiene-1,3, and 0.05 parts of $(NH_4)_2S_2O_8$ at 60° C. under nitrogen with stirring for 6 hours. The latex was coagulated in methanol, the resin was washed thoroughly, and dried in a vacuum oven. A conversion of 90.6% of monomers to resin was obtained. This resin was found to have a Brabender plasticorder torque of 2250 meter grams, a notched Izod impact strength of 1.9 foot pounds per inch of notch, and the following physical properties:

| | |
|---|---|
| ASTM heat distortion temperature ° C. | 60 |
| Flexural strength p.s.i. | $6.7 \times 10^3$ |
| Flexural modulus p.s.i. | $1.8 \times 10^5$ |
| Tensile strength p.s.i. | $4.9 \times 10^3$ |

(C) The procedure of (A) above was repeated with the inclusion of 11.5 parts of butadiene per 250 parts of other ingredients in the initial polymerization recipe. The final resin product, which is outside the scope of this invention, was infusible and burned up in the Brabender indicating that it was a highly cross-linked, non-thermoplastic resin.

EXAMPLE 2

(A) A polymer latex was prepared in accordance with the procedure of Example 1(A) using the following ingredients:

| Ingredient: | Parts |
|---|---|
| Water | 250 |
| Emulsifier (Alipal CO 436) | 1.5 |
| Methacrylonitrile | 98 |
| Vinyl n-butyl ether | 2 |
| Limonene dimercaptan | 0.5 |
| $(NH_4)_2S_2O_8$ | 0.05 |

The polymerization was carried out at 60° C. for 24 hours and an 87.9% conversion was achieved.

(B) Two-hundred fifty parts of latex (A) of this example were treated with 10.8 parts of butadiene and 0.04 parts of $(NH_4)_2S_2O_8$ at 60° C. for 7 hours. The final latex was obtained in 90% conversion and the resulting resin was found to have a notched Izod impact strength of 1.4 foot pounds per inch of notch and a Brabender plasticorder torque of 1760 meter grams.

EXAMPLE 3

The procedure of Example 1(B) was repeated using the following ingredients:

| Ingredient: | Parts |
|---|---|
| Water | 250 |
| Emulsifier (Alipal CO 436) | 1.5 |
| Acrylonitrile | 75 |
| Vinyl isobutyl ether | 25 |
| Limonene dimercaptan | 0.5 |
| $(NH_4)_2S_2O_8$ | 0.05 |

At 49.8% conversion, 12.3 parts of butadiene were added to the polymerization mixture, and the reaction was continued for an additional 3½ hours to produce a 66.5% final conversion of dried resin which was found to have a Brabender plasticorder torque of 1330 meter grams, a notched Izod impact strength of 6.1 foot pounds per inch of notch, and the following other physical properties:

| | |
|---|---|
| ASTM heat distortion temperature ° C. | 54 |
| Flexural strength p.s.i. | $6.6 \times 10^3$ |
| Flexural modulus p.s.i. | $6.8 \times 10^5$ |
| Tensile strength p.s.i. | $4.6 \times 10^3$ |

We claim:
1. The process comprising polymerizing in an aqueous emulsion to at least 50% by weight conversion of a monomer component comprising
   (A) from about 70 to 98% by weight of at least one nitrile having the structure

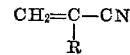

wherein R is a member selected from the group consisting of hydrogen, a lower alkyl group having from 1 to 4 carbon atoms and a halogen, and
   (B) from about 2 to 30% by weight based on the combined weights of (A) and (B) of at least one vinyl ether having the structure

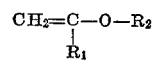

wherein $R_1$ is a lower alkyl group or preferably hydrogen, and $R_2$ is an alkyl group having from 1 to 12 carbon atoms or an aromatic group having from 6 to 12 carbon atoms,
and then including in the polymerization from 1 to 40 parts by weight per 100 parts by weight of (A) plus (B) of (C) a monomer component having at least one conjugated diene monomer selected from the group consisting of butadiene and isoprene, and continuing the polymerization to a final conversion of from 70 to 100% by weight of monomers to polymer.

2. The process of claim 1 carried out in the substantial absence of oxygen and at a temperature in the range of from 0° C. to 100° C.

3. The process of claim 2 wherein the polymerization of monomer component (A) plus (B) is carried out to at least 80% by weight conversion before including monomer component (C).

4. The process of claim 3 wherein monomer component (A) is acrylonitrile.

5. The process of claim 3 wherein monomer component (A) is methacrylonitrile.

6. The process of claim 3 wherein monomer component (B) is butyl vinyl ether.

7. The process of claim 3 wherein monomer component (B) is isobutyl vinyl ether.

8. The process of claim 3 wherein monomer component (C) is butadiene.

References Cited

UNITED STATES PATENTS 3,451,538   6/1969   Trementozzi _____ 260—879 X

JAMES A. SEIDLECK, Primary Examiner

W. F. HAMROCK, Assistant Examiner

U.S. Cl. X.R.

260—29.7 R, 80.7